United States Patent
Day

(10) Patent No.: US 11,186,342 B2
(45) Date of Patent: Nov. 30, 2021

(54) MOTORIZED WHEEL SYSTEM FOR PEDIATRIC STANDER

(71) Applicant: Steven Day, Rochester, NY (US)

(72) Inventor: Steven Day, Rochester, NY (US)

(73) Assignee: Institute of Technology, Rochester, NY (US)

( * ) Notice: Subject to any disclaimer, the term of this patent is extended or adjusted under 35 U.S.C. 154(b) by 235 days.

(21) Appl. No.: 16/173,765

(22) Filed: Oct. 29, 2018

(65) Prior Publication Data

US 2019/0127011 A1 May 2, 2019

Related U.S. Application Data

(60) Provisional application No. 62/577,836, filed on Oct. 27, 2017.

(51) Int. Cl.
| | |
|---|---|
| *B62D 65/10* | (2006.01) |
| *B62D 61/00* | (2006.01) |
| *B62D 51/02* | (2006.01) |
| *A61G 5/04* | (2013.01) |
| *A61H 3/04* | (2006.01) |
| *B62K 19/24* | (2006.01) |
| *B62K 11/00* | (2006.01) |

(52) U.S. Cl.
CPC .............. *B62K 19/24* (2013.01); *B62D 51/02* (2013.01); *B62D 61/00* (2013.01); *B62D 65/10* (2013.01); *B62K 11/00* (2013.01)

(58) Field of Classification Search
CPC .... A61G 5/047; A61G 7/1046; A61G 7/1048; A61G 2203/22; A61G 2203/16; A61H 3/04; A61H 2003/22; A61H 2003/043; B62D 51/02; B62D 61/00; B62D 65/10
USPC ................... 180/11, 12, 13, 15, 16
See application file for complete search history.

(56) References Cited

U.S. PATENT DOCUMENTS

| | | | |
|---|---|---|---|
| 4,744,578 A | 5/1988 | Stearns | |
| 4,968,050 A | 11/1990 | Kendrick et al. | |
| 4,987,622 A | 1/1991 | Shockey | |
| 5,016,720 A * | 5/1991 | Coker | A61G 5/047 180/13 |
| 5,390,753 A * | 2/1995 | Parker | A61G 5/045 180/19.1 |

(Continued)

FOREIGN PATENT DOCUMENTS

| | | |
|---|---|---|
| CN | 203736355 | 7/2014 |
| WO | 2016181173 | 11/2016 |

OTHER PUBLICATIONS

Karman Healthcare, Inc "XO-202 Motorized Wheelchair" pp. 1-10 https://www.karmanhealthcare.com/product/xo-202/ Accessed Dec. 3, 2018.

(Continued)

*Primary Examiner* — Anne Marie M Boehler

(74) *Attorney, Agent, or Firm* — Bond Schoeneck & King, PLLC; Joseph M. Noto

(57) ABSTRACT

A motorized and controllable wheel system for a non-motorized stander is disclosed. Micro-controllers are programmed to be capable of acquiring and processing multiple inputs from the user and therapist and controlling the motors. Additional sensors are implemented in order to enhance safety and provide some device autonomy with the goal of providing a device that improves the mobility, autonomy, and educational experience of children.

6 Claims, 10 Drawing Sheets

(56) References Cited

U.S. PATENT DOCUMENTS

| | | | |
|---|---|---|---|
| 5,618,055 A | 4/1997 | Mulholland | |
| 6,186,252 B1 | 2/2001 | Schaffner et al. | |
| 6,481,514 B2* | 11/2002 | Takada | A61G 5/047 |
| | | | 180/11 |
| 6,619,681 B2 | 9/2003 | Gutierrez | |
| 7,036,512 B2 | 5/2006 | Harnois | |
| 8,430,189 B2* | 4/2013 | Tallino | A61G 5/047 |
| | | | 180/11 |
| 8,567,808 B2 | 10/2013 | Tholkes et al. | |
| 9,272,589 B2* | 3/2016 | Yamano | B62K 11/007 |
| 9,364,379 B2 | 6/2016 | Hammond et al. | |
| 9,744,095 B1* | 8/2017 | Mazzei | B62K 5/007 |
| 9,757,290 B1* | 9/2017 | Scognamiglio | B62K 13/04 |
| 10,286,977 B1* | 5/2019 | Haenel | B62K 11/007 |
| 10,751,232 B1* | 8/2020 | Ilao | A61G 5/047 |
| 2001/0013435 A1* | 8/2001 | Ono | B62D 51/005 |
| | | | 180/19.2 |
| 2003/0074732 A1* | 4/2003 | Hanson | A61G 7/1074 |
| | | | 5/81.1 R |
| 2006/0000664 A1* | 1/2006 | Huang | A61G 5/047 |
| | | | 180/198 |
| 2006/0102392 A1* | 5/2006 | Johnson | B62B 3/04 |
| | | | 180/19.1 |
| 2008/0197598 A1* | 8/2008 | Mills | A61G 5/1051 |
| | | | 280/250.1 |
| 2010/0013276 A1* | 1/2010 | Tholkes | A61G 5/1094 |
| | | | 297/174 R |
| 2010/0038154 A1* | 2/2010 | March | A61G 5/027 |
| | | | 180/14.1 |
| 2010/0180380 A1* | 7/2010 | Van Scheppingen | A61G 7/08 |
| | | | 5/510 |
| 2012/0029697 A1* | 2/2012 | Ota | B66F 9/063 |
| | | | 700/253 |
| 2012/0318311 A1* | 12/2012 | Alghazi | A61G 5/10 |
| | | | 135/66 |
| 2016/0074266 A1* | 3/2016 | Nakamoto | A61H 3/04 |
| | | | 224/272 |
| 2018/0141609 A1* | 5/2018 | Newhouse | B62K 13/08 |
| 2018/0148080 A1* | 5/2018 | Huizinga | B62B 5/0046 |
| 2019/0365585 A1* | 12/2019 | Hacikadiroglu | A61H 3/008 |

OTHER PUBLICATIONS

The Standing Company "Superstand" pp. 1-2 http://thestandingcompany.com/products/2799394 Accessed Dec. 3, 2018.
Redman Power Chairs "Redman Chief 107-ZRx" pp. 1-6 https://www.redmanpowerchair.com/ Accessed Dec. 3, 2018.
Matia Robotics "The TEK RMD" pp. 1-5 https://www.matiarobotics.com/ Accessed Dec. 3, 2018.
Permobil "SmartDrive MX2" pp. 1-4 http://www.permobil.com/en/Corporate/ Accessed Dec. 3, 2018.
Levo "Combi Jr." pp. 1-11 https://levousa.com/products/combi/ Accessed Dec. 3, 2018.
Quantum "iLevel Power Chair" pp. 1-20 https://www.quantumrehab.com/ilevel-power-chairs/ Accessed Dec. 3, 2018.

* cited by examiner

MOTORIZED WHEEL SYSTEM FOR PEDIATRIC STANDER

CROSS REFERENCE

This application claims the benefit of the filing date of U.S. Provisional Patent Application Ser. No. 62/577,836, filed Oct. 27, 2017, which is hereby incorporated by reference in its entirety.

FIELD

The present invention relates to a motorization kit attachable to a non-motorized stander, and in particular to a universal motorization kit attachable to a non-motorized stander and method.

BACKGROUND

Standers are established devices that support a person in an upright position. These are used in therapy sessions to increase bone and core strength and allow students to interact with other children and their classroom environment at the same height as their peers. Unfortunately, non-motorized standers do not allow for any means of mobility or requires substantial manual strength, leaving many being pushed around the room by an adult.

A significant number of children are confined to a sitting position during the school day. This interferes with education and esteem as it reduces access to their environment. Specifically, students should have the ability to look peers eye-to-eye, to interact with tabletop activities, and to move about gym class in a standing posture. Cerebral Palsy (CP) is the most common motor disability in childhood, affecting 1 of every 323 children, and nearly half of children with CP cannot walk independently by age 8. There are additional diseases affecting mobility.

Prior technology includes standers that are not motorized so the person is either stationary of moved from one place to another with the assistance of a person. Prior technology includes motorized wheel chairs which address the need for mobility, but not the utility described above. Prior technology does include some commercial standing wheelchairs or sit-to-stand standing wheelchairs. See (levousa.com). These are not modification kits and do not include many of the features described in this invention.

All commercially available standers are either: 1) stationary, 2) on casters and able to pushed from place to place by an aid or assistant or 3) have manually propelled wheels.

Therapy sessions in a stationary stander are boring. This leads to non-compliance with prescribed therapy. Remaining sitting and stationary in a school setting has adverse physiological and psychological effects. Autonomous movement in an upright position has advantages in many situations and is currently not a possibility for many people.

This invention is a modification kit to existing standers rather than a reinvention of the stander. This invention solves several problems relevant to these existing devices. Most researches in the field of Physical Therapy are not aware of the current state of the art of components that are integrated into this invention, or possibly unable to design the system with sufficient mechanical, electrical, and software capabilities.

The art lacks a system capable of modifying off the shelf standers with a motor, a controller and some human interface (currently buttons) so that a child can be mobile, upright, and autonomous. The art lacks a modification kit which can be sold for a fraction of the price of a commercial stander, yet dramatically increases the functionality of the stander.

SUMMARY

In accordance with one aspect of the present invention, there is provided a kit for converting a non-motorized stander to a motorized stander including:

a lower assembly including at least one drive wheel connected to a platform, a motor connected to the at least one drive wheel, a power plant connected to the motor, a bumper connected to the platform, at least one sensor connected to the platform, and at least one customizable mounting plate connected to the platform;

a microprocessor;

an upper tray assembly including an input device including a wireless input which controls wheel motion and steering; and a pole adjustable in height connecting the lower assembly with the upper tray assembly, wherein the at least one customizable mounting plate includes a mounting device attachable to a non-motorized stander.

In accordance with another aspect of the present disclosure, there is provided a method for converting a non-motorized stander to a motorized stander including: removing a wheel assembly from a non-motorized stander; and attaching the non-motorized stander to at least one customizable mounting plate of a kit according to the present invention.

In accordance with another aspect of the present disclosure, there is provided a universal motorized kit for converting a non-motorized stander to a motorized stander including:

an assembly of mechanical and electrical components including:
  a) mechanical components including one or more of the following:
     lower platform/platform,
     adapter plates to allow connection of entire device to stander at two points using existing threaded holes on a non-motorized stander,
     wheels and wheel supports,
     upper tray (and support),
     electronics enclosures,
     shroud/bumper,
     sensor support,
     input devices including joystick, and
     mechanical switches;
  b) electrical components including one or more of the following: motors,
     battery,
     motor controller electronics,
     input microcontroller,
     bluetooth or wireless receiver (includes program),
     input conditioning electronics,
     position sensors,
     additional sensors for visual or other position awareness,
     GPS,
     vision, and
     microcontroller to determine appropriate path and communicate to motor controller board; and
  c) algorithms performing one or more of the following functions:
     motors,
     battery,
     motor controller electronics, input microcontroller,
input conditioning electronics,
position sensors,
additional sensors for visual or other position awareness,
GPS, and
vision.

These and other aspects of the present disclosure will become apparent upon a review of the following detailed description and the claims appended thereto.

DETAILED DESCRIPTION

As compared to available standing wheelchairs or sit-to-stand wheelchairs, this invention has the advantage of being much more cost effective, being able to be retrofit to any commercially available stander, and includes many of the features described in this disclosure (the prior art does not). These include: including wireless augmented control, safety sensors, universal mounting system, and flexibility of user input.

Figure 1:
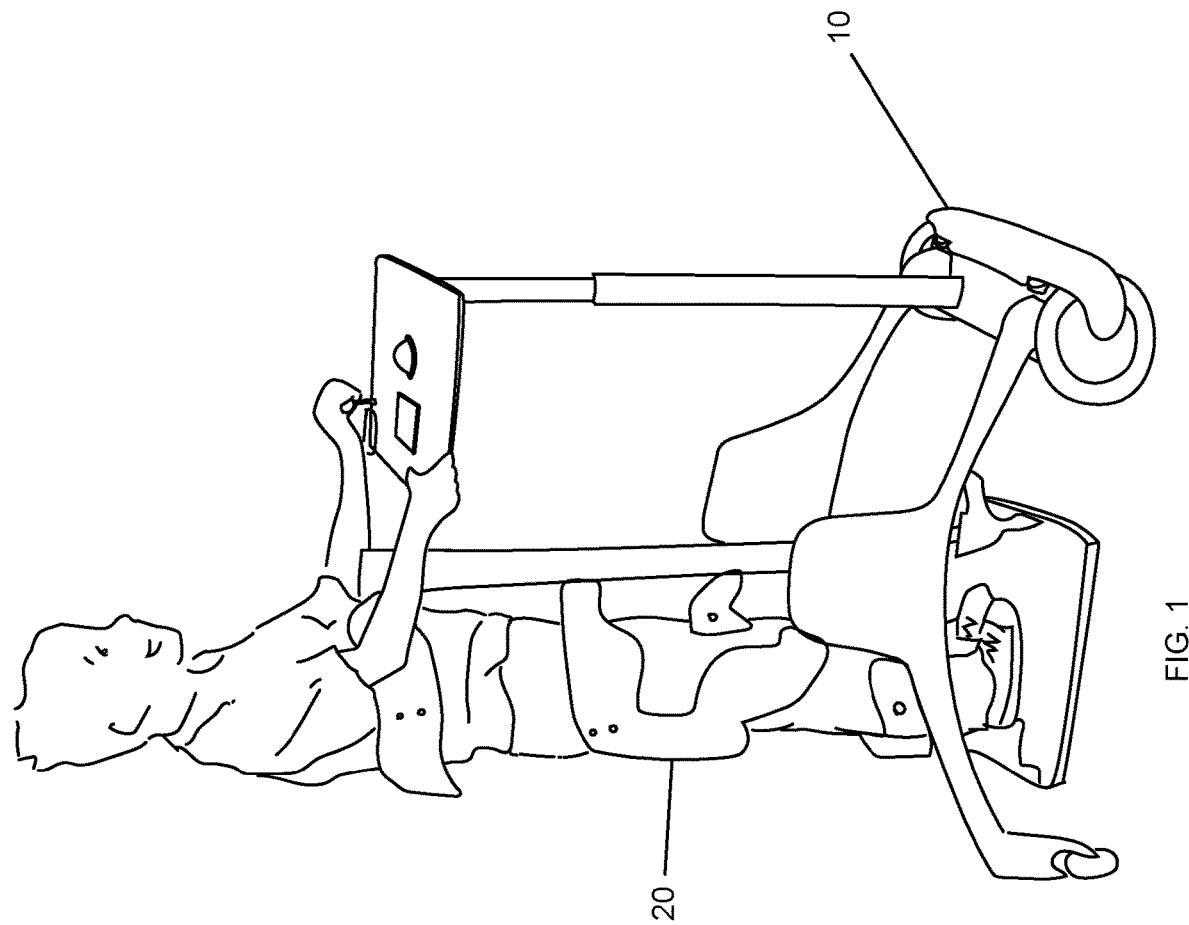
FIG. 1 is a perspective view of a person interacting with a motorized wheel kit attached to a commercially available stander according to an embodiment of the subject invention.
Figure 2:
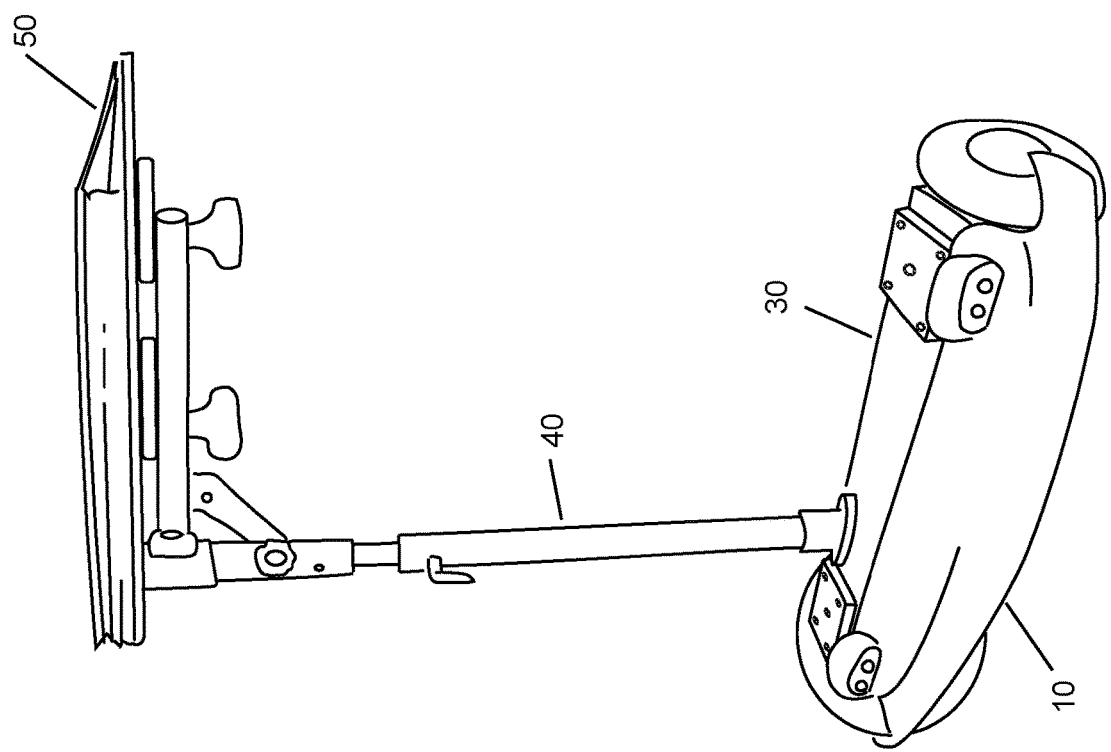
FIG. 2 is a perspective view of a motorized wheel kit according to an embodiment of the subject invention.

Referring to the figures wherein like numerals indicate like or corresponding parts throughout the several views, a motorized wheel modification kit 10 for non-motorized standers 20 is generally shown in FIG. 1. The kit 10 includes mechanical components of a lower assembly 30, which is connected both mechanically and electronically through a height adjustable pole 40 to an upper tray assembly 50. These components are shown in FIG. 2 and the specific components of the lower assembly 30 and the tray assembly 50 are described in more detail below.

Figure 3:
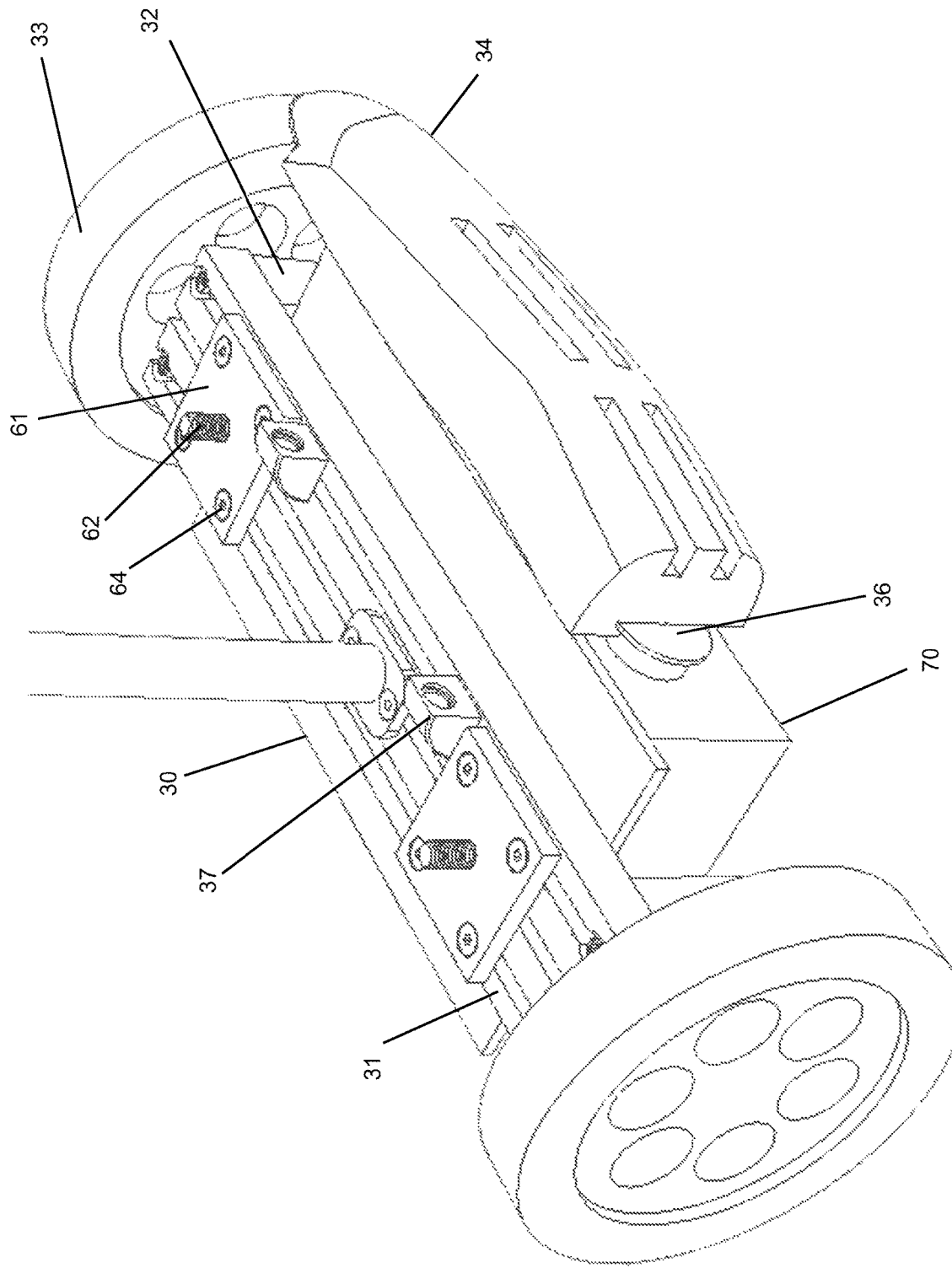
FIG. 3 is a perspective view of the lower assembly of a motorized wheel kit according to an embodiment of the subject invention.

The lower assembly 30 shown in FIG. 3 is composed of a lower platform 31, which mechanically joins wheel mounts 32 that support and align motorized wheels 33. At least one drive wheel is connected to the platform, and preferably a pair of drive wheels. In a preferred embodiment, the motors are integrated into wheels 33, although other configurations would include a motor and drive system powering wheels 33. The lower platform 31 supports a bumper 34, which may be a single piece of plastic that encloses or encapsulates the lower assembly 30 and acts like a shroud. The bumper 34 attaches to the lower platform 31. This protects components from damage, including some water protection. The bumper 34 is flexible and triggers a mechanical bump switch 36 to detect physical contact with an object. The lower platform 31 supports a lower electronics enclosure 70 that contains a power plant, such as a battery 71, motor controller electronics 72 for motor control, as well as a microcontroller 73 to interpret various commands and determine the appropriate wheel movement. The lower assembly 30 includes safety sensors, including both a mechanical bump switch 36 and non-contacting sensors 37. These sensors communicate additional information to the central controller 75. The lower assembly 30 also includes non-contacting proximity sensors 37, such as infra-red or ultrasound sensors. Non-contacting proximity sensors 37 are attached to the lower platform 31.

Figure 4:
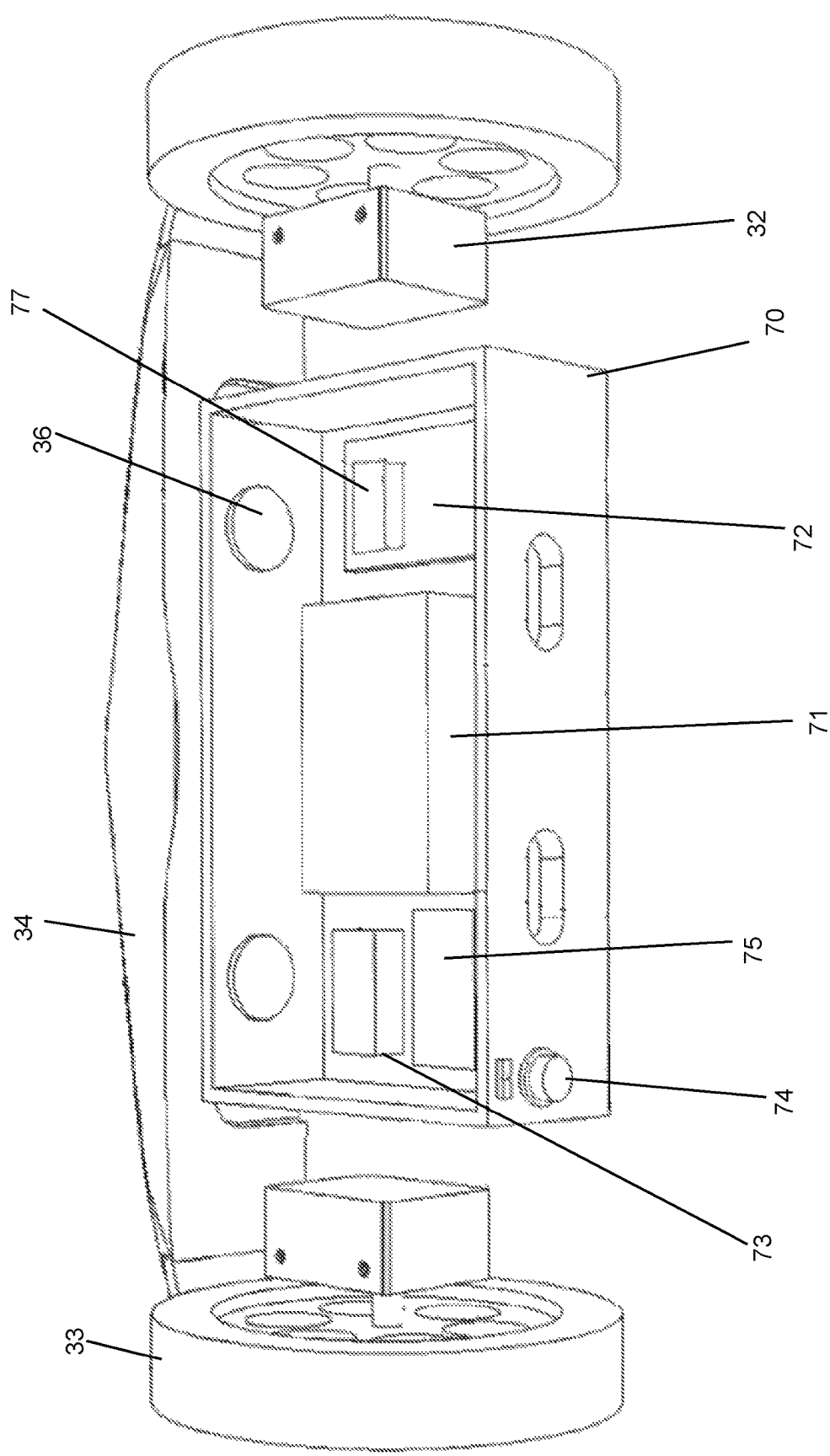
FIG. 4 is a rear perspective view of the lower assembly of a motorized wheel kit according to an embodiment of the subject invention.

The lower electronics enclosure 70 in shown in FIG. 4 with the lower platform 31 removed so that the contents of the lower enclosure are visible. Within the lower electronics enclosure 70 is a battery 71, motor controller electronics 72, Bluetooth or wireless receiver 73, additional sensors for visual or other position awareness such as GPS 75. The main microcontroller 77 is contained within this enclosure.

Figure 5C:
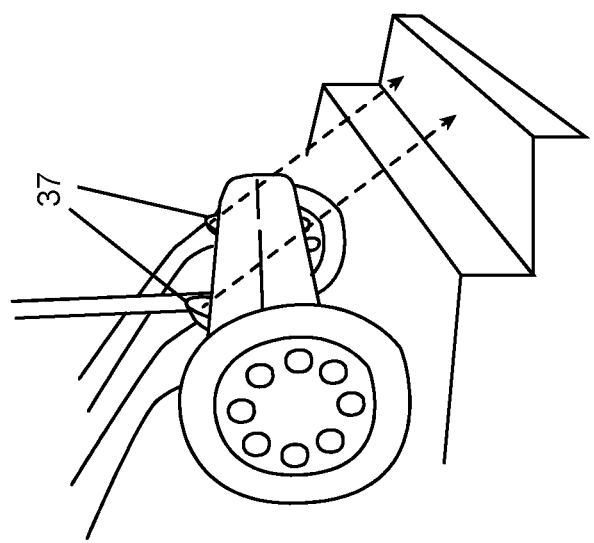
FIGS. 5A, 5B and 5C are schematics of the function of safety sensors according to an embodiment of the subject invention.
Figure 5B:
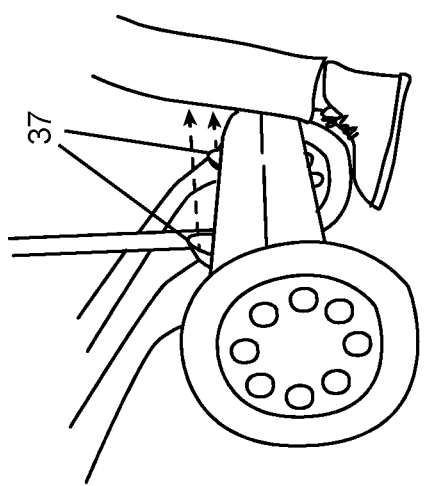
Figure 5A:
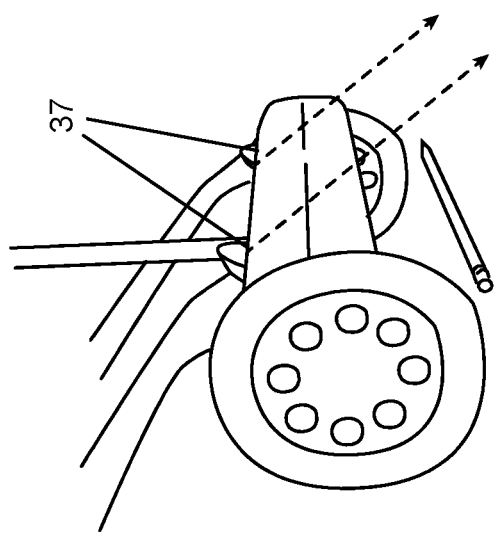

The non-contacting position sensors 37 overlooking the front wheels are used to detect the presence of objects or used to detect the absence of floor, such as descending stairs or a curb, as shown in FIGS. 5A-5C. These sensors may use ultrasound, optical, infrared, or LIDAR sensors.

Figure 6:
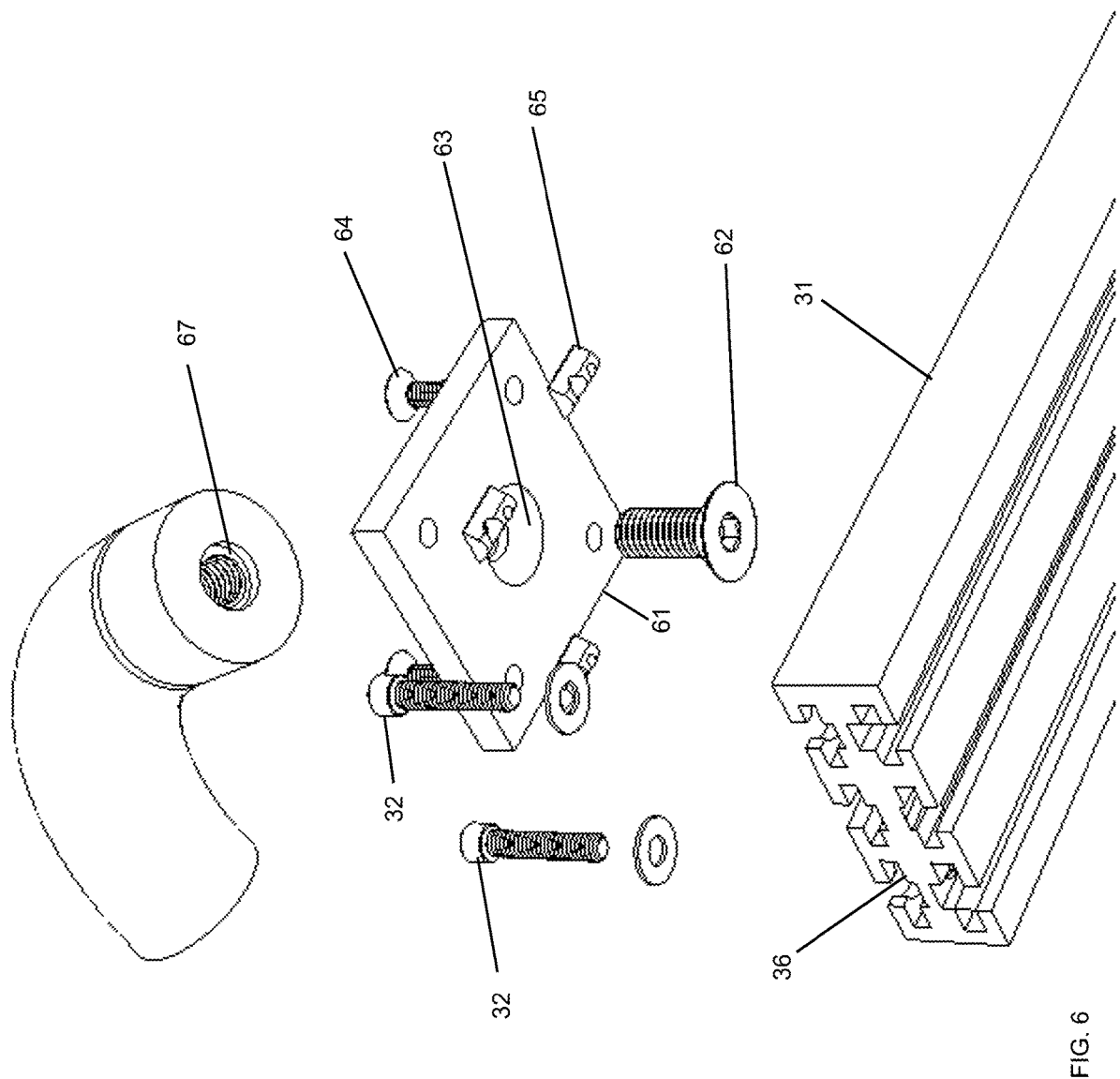
FIG. 6 shows a telescoping view of the universal mounting plate and attachment to the lower platform that allows for fitting to any non-motorized stander according to an embodiment of the subject invention.

The lower platform 31 connects to a non-motorized stander by way of mounting plate 61, shown in FIG. 6. A single screw 62 passes upwards from the mounting plate 61 through clearance hole 63 and into a female threaded hole 67 within the commercial non-motorized stander. This embodiment of a modification plate is compatible with any stander that leaves a female threaded hole 67 upon removal of the front wheels. Alternatively, by way of example, a stander that has a male thread or a clearance hole at this location 67, or any other connection features, from modification of a stationary stander, such as a manually propelled stander having casters or having manually propelled wheels, could be connected to mounting plate 61 with appropriate hardware connection variations and embodiments. In accordance with an embodiment shown in FIG. 6, mounting plate 61 is secured to the stander and screws 64 passing from the mounting plate 61 into T-nuts 65 within the lower platform 31 secure these plates to the lower platform 31, and therefore entire motorized kit 10. The lower platform 31 attaches to the existing holes 67 within any stander via two mounting plates 61, provided as part of the kit 10. One feature of these mounting plates 61 is that they may be customized to the particular stander 20 by the selection of an appropriate screw 62 and modification of clearance hole 63 through mounting plate 61 to match the diameter of screw 62. All other features of mounting plate 61 are common for all mounting plates. Different models of standers may have different distances between the front two threaded holes 67. This is universally accommodated by the kit 10 because mounting plate 61 attaches to the lower platform 31 via screws 64 into t-nuts 65 and these screw and t-nut can sit anywhere along channels 36 which can extend the entire length of lower platform 31.

Figure 7:
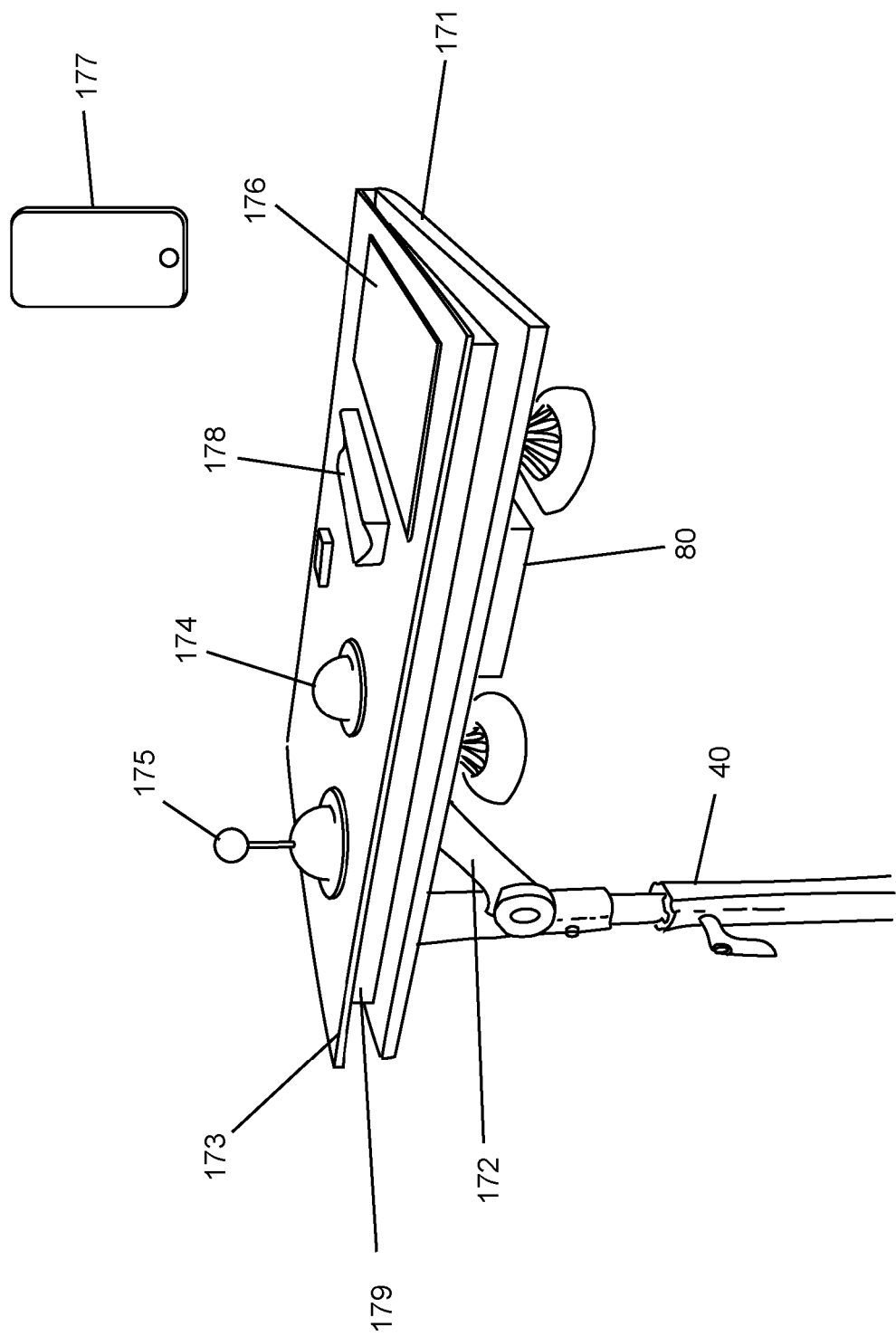
FIG. 7 is a perspective view of the top tray assembly according to an embodiment of the subject invention.

The support pole 40, FIG. 7, allows for adjustment of position of the upper tray 171, mechanically supports the upper tray 171, and includes routing of a cable assembly internal to 70 that transmits power and information between the upper tray controller and the central controller. The upper tray 171 is adjustable, allowing for positioning in three linear directions and in three rotational directions via a mechanical mechanism 172 and mechanism 179 between the tray base 171 and control mounting surface 173 to allow for unique positioning for the driver.

The upper tray 171 is connected via the tray support pole 40 to the lower platform 35 at one location. The upper tray 171 includes a control mounting surface 173, such as Lego, Velcro, or magnetics that allows for various switches to be attached, but easily moved so that the number of switches, position of switches can be easily adjusted for a particular user or even a particular scenario. As an example, one or more switch buttons 174 may be used. In the preferred embodiment this is done via a universal mechanical attachment, such as a Lego peg board on the tray and Legos attached to the bottom of switches. In an alternative embodiment, this mechanical attachment could be a proprietary mechanical system or could be done with an array of magnets used to locate and hold the switches in position. Alternative inputs include joystick 175, touchscreen device 176, or a remote control 177. The upper tray assembly may contain ergonomic accommodations, such as arm rest 178. The touchscreen device 176 may also serve as a display.

The upper tray 171 includes an input electronics enclosure 80. This enclosure 80 includes an input microcontroller 81 which receives information from multiple sources, including the joystick 175, input switches 174, touchscreen device 176, and from remote controls via hardware to gather the wireless signal such as Bluetooth, Wifi, or R/C receiver 82. Input conditioning electronics 83, such as digital or analog circuits to interpret or power the inputs are enclosed within the upper enclosure.

Figure 8C:
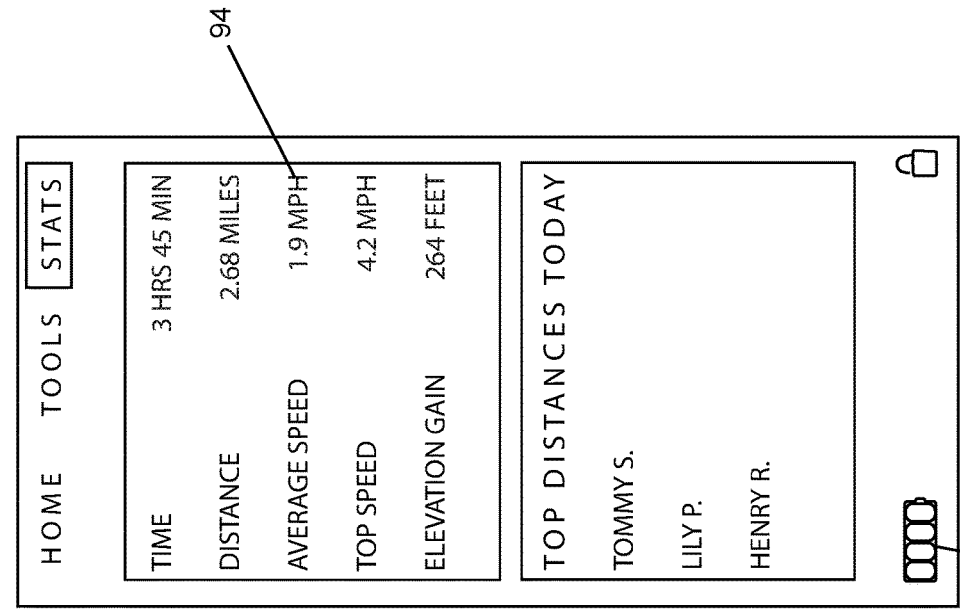
FIGS. 8A, 8B and 8C is a schematic of user interfaces of the remote control according to an embodiment of the subject invention.
Figure 8B:
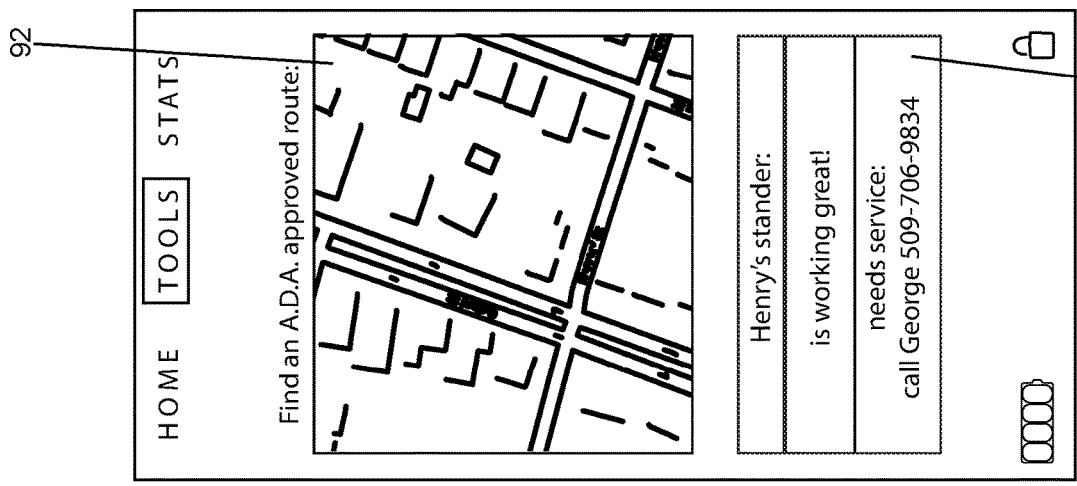
Figure 8A:
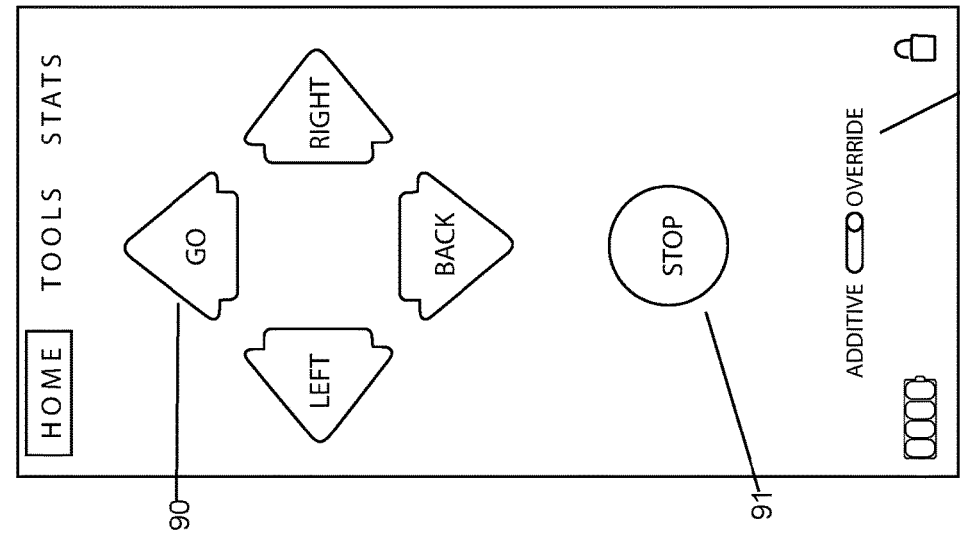

This wireless input device 177 would typically be used by a therapist, parent, or adult and may be referred to as the assistant input. The assistant input would include inputs for cardinal directions 90 forward, backwards, right, left, as well as stop 91 on one screen, as shown in FIG. 8A. Additional inputs, such as additive/override 96 from the remote determine the function of the algorithm 102. Additional screens would include a screen that indicates position 92, using device GPS or other sensors, as well as diagnostic state of the device 93, as shown in FIG. 8B. Additional information includes statistics about usage 94 including speed, distance, and time of use, as shown in FIG. 8C. Battery indicator 95 will be communicated to the remote and displayed.

The ability to change speeds of the device via the wireless app. The ability to change maximum speed with a physical knob or switch 74 on the device, as shown in FIG. 4.

In one embodiment, a touch screen device is used as the primary source of input and this sole source of input could be controlled by the child. In this case, all of the functionality shown in FIGS. 8A-8C would be included in the device 176 in FIG. 7.

Figure 9:
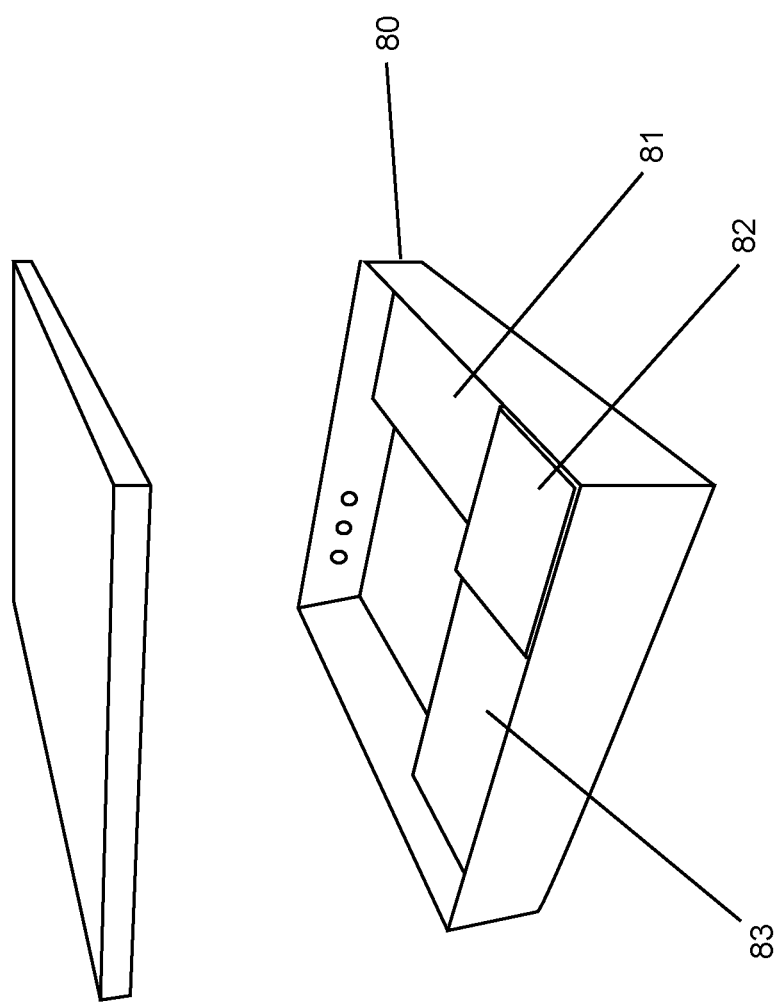
FIG. 9 is a view of the upper electronics enclosure according to an embodiment of the subject invention.
Figure 10:
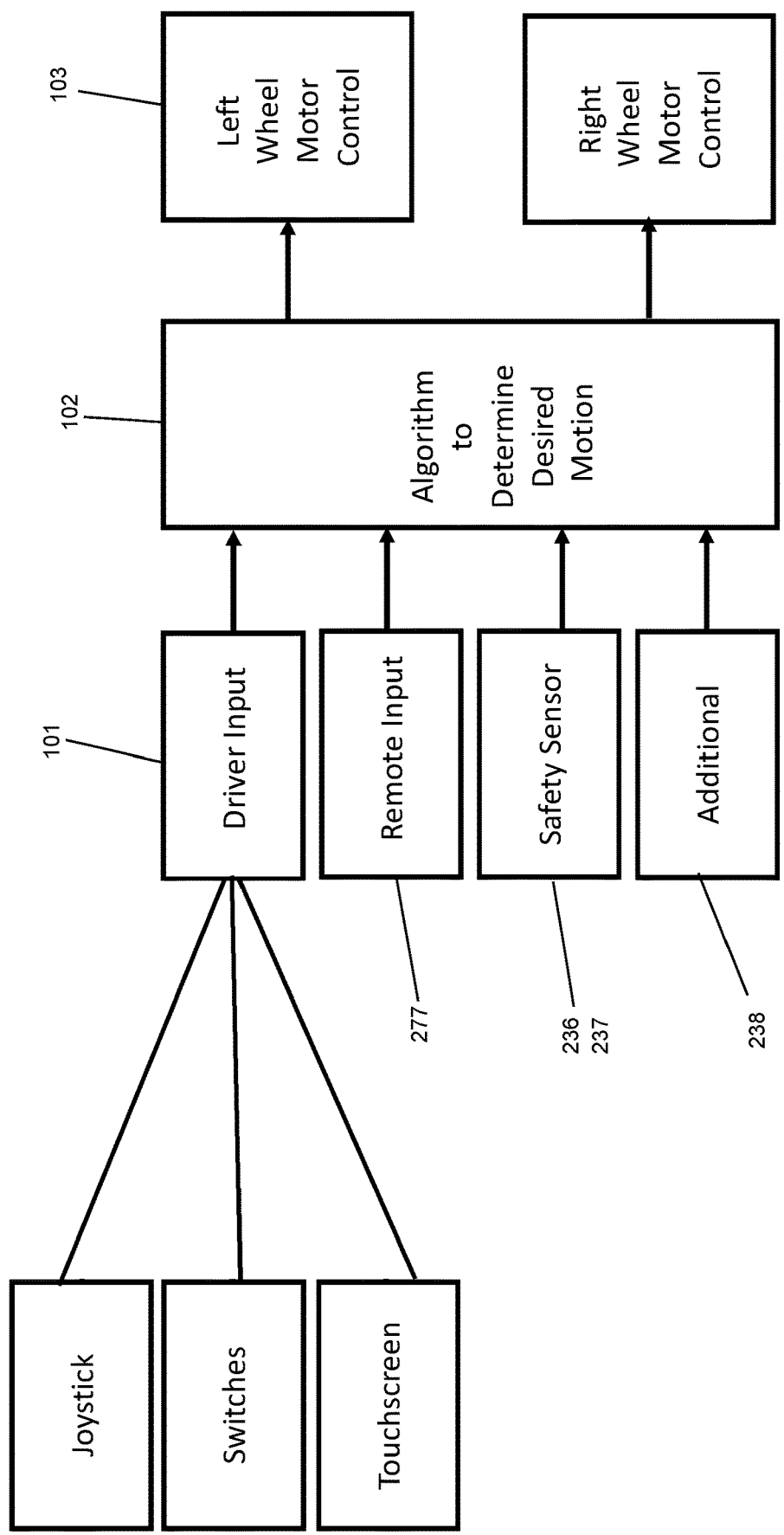
FIG. 10 is a schematic of the flow of information according to an embodiment of the subject invention.

The interpretation of these multiple signals and determination of driver input 101, shown in FIG. 10, is performed on the input microcontroller 81, shown in FIG. 9. The combined driver input 101 is combined with information 277 from the remote 177, information 236 and 237 from sensors 36 and 37, and additional sensors 238. The algorithm 102 is embedded on the main microcontroller 77 and integrates information from these multiple sources in order to determine appropriate motion of the stander. As examples of this algorithm: 1) Additive function: the combined input of forward switch and a right from the wireless device will make the device continue forward with a sweeping turn to the right. 2) Remote override: Forward joystick and stop from remote will make the stander stop. 3) Forward from stander with object detection from bump sensor will cause the stander to stop. 4) Reverse from stander with object detection will allow the stander to move in reverse. The calculated desired user action is communicated from the main microcontroller 77 to the motor controller 72 via standard digital or analog protocols. This information flow is shown in FIG. 10 as 102 to 103. As illustrated in FIG. 10, an algorithm 102 is embedded on main microcontroller 77.

This device integrates existing technologies with algorithms and hardware in a unique manner. The kit replaces two of the passive wheels on a stander with motorized and controllable wheels. Readily available micro-controllers are programmed to be capable of acquiring and processing multiple inputs from the user and therapist and controlling the motors. Additional sensors could be implemented (i.e., to detect the presence of obstacles or people) in order to enhance safety and provide some device autonomy, but a goal is not an autonomous robot, but rather a device that improves the mobility, autonomy, and educational experience of children.

In a preferred form of the invention, all of the components described are assembled into a device and the device is attached to the front wheel supports of a commercial non-motorized stander. The kit can be shipped within one box to any end user and installed by that end user onto any stander by a person with average mechanical abilities and requiring only the following modification of the original stander: removal of front two wheels and attachment of entire device—via mounting plates—to the existing threaded holes within the device. The wheel mounts are attached directly to the lower platform and wheels supported by these mounts. The lower enclosure, shroud, and sensor mounts are all attached directly to the lower platform.

The wireless input would typically be used by a therapist, parent, or adult and may be referred to as the assistant input. It is possible that a wireless device such as a smartphone, iPad or tablet be used as the sole source of input and this sole source of input could be controlled by the child. The interpretation of these multiple signals and determination of what user requested motion is performed on input microcontroller 81 and shown schematically at 101. This algorithm includes additive functions for example the combined input of forward switch and a right from the wireless device. It includes safety functions, i.e. a Stop from wireless takes precedent over switches or joystick. The calculated desired user action is communicated to the motor controller via standard digital or analog protocols.

Wheel motion and differential steering. The motion of each of the motor driven wheels can be determined independently and the motion of each wheel can vary continually from a maximum reverse speed to a maximum forward speed. When both wheels are asked to rotate at the same rate and in the same direction, motion along a straight line occurs. When the motors are commanded to rotate at different speeds, the standers yaws and this is used to steer the device. The radius of curvature of this is a function of the difference in speeds between the motors and is, therefore, also variable and ranges from "spinning"—pure yaw with no forward motion to "infinity"—nearly straight line motion with a very slow rate of yaw. The motions are available for both forward and reverse motion.

Some scenarios that may be conducive to this:
  Straight line when user input is forward on joystick or switch and no other inputs available.
  Forward with some adjustment in heading may be used when driver is in straight line and assistant is pressing a turn button, to be used when heading towards a desired location is not exactly right.
  When drop is detected in front of one stander wheel, reverse on both wheels, but with higher speed on wheel detecting drop.

The actual position of each wheel is monitored via the hall effect or other sensors within the wheel and this information is used by the motor controllers to ensure that each wheel has moved the distance requested. The invention should cover a configuration where the following functions are performed by a single controller or an alternative configuration of microcontrollers.

Interpretation of multiple user inputs to create a desired user direction include interpretation of additional sensors, including safety sensors and navigation information and directions sent to each wheel to generate motion.

The terms driver and assistant and it should be clear that this is valid for all sizes of people.

The integration of a vision, ultrasound, GPS or other navigational system could provide input to the central controller. The central controller would still consider the inputs from user, from wireless remote, from safety sensors before making a decision about desired wheel motion, but information from the navigational system would be considered as part of this decision.

This would include a dance mode wherein the device uses an acoustic sensor (microphone) to acquire signature of surrounding environment. In this mode, the device will determine the primary frequencies of the sound, which is typically occurring at the frequency of the beat in music. The device will generate a motion pattern of rotational and translational patterns that is in synchrony with the patterns, thereby allowing the stander and driver to dance without the requirement of user input synchronized with the beat.

In a tracking/flocking mode the device is aware of the presence and location of other agents, whether they are additional standers or people carrying some transmission device and the stander motor controller is designed to move with the crowd, mimicking the behavior of a peripatetic human walking with a crowd, where small adjustments in heading and speed are made subconsciously.

A target/base station function includes the awareness of the stander to particular fixed positions of some significance. For example, a classroom desk, the kitchen sink, a parking/charging point for wireless charging when the stander is docked in a certain location. This could also be used for the stander to return autonomously to a charging station or to autonomously return to the user based on a location device held by the user. The device is an assembly of hardware and software forming a system that could be mechanically attached to most any device and thereby allowing controlled motion of that object. The immediate use is pediatric sized standers. This could include modification of the stander by addition of these parts. This could also include a kit that is distributed and then used to modify an existing stander.

Several important uses include a person is prescribed physical therapy sessions on a regular basis where they are to "stand" in a standing device from 30-60 minutes once or more per day. The use of this device during those sessions is to increase the enjoyment of those sessions. The ability to move is, in itself, pleasurable and makes the therapy sessions more interesting. This in turn, increases the compliance with the prescribed therapy, making it more likely that the person will adhere to prescribed therapy sessions.

Allowing a student to autonomously move about their school environment in an upright position has the utility of increasing autonomy and self-esteem and peer interactions, literally allowing for eye-to-eye contact at the same height. In some environments, such as gym class and outdoor play, being upright is important for the same reasons and inclusion.

Mobility is an important use of this device. For a person unable to locomote from place to place under their own control, the standard solution is a wheelchair, which places the person in a lower sitting position. In an environment such as shopping within a store or shopping center, a motorized device that places the person in a standing position rather than sitting carries functional (you can see over racks) and psychological (people are not looking down at you) advantages.

Potential future realizations could include:
  A larger size, more powerful system for heavier loads including adult standers.
  Systems that accept input from various sources, including: proximity sensors, smart phones, fixed "base stations."
  The system could be used to mobilize any consumer product, including recreational items such as drink coolers.

Although various embodiments have been depicted and described in detail herein, it will be apparent to those skilled in the relevant art that various modifications, additions, substitutions, and the like can be made without departing from the spirit of the disclosure and these are therefore considered to be within the scope of the disclosure as defined in the claims which follow.

What is claimed:

1. A kit for converting a non-motorized stander to a motorized stander that supports a person in an upright position, comprising:
  a lower assembly comprising at least one drive wheel connected to a platform, a motor connected to the at least one drive wheel, a power plant connected to the motor, a bumper connected to the platform and extending beyond the at least one drive wheel towards a front of the lower assembly so as to absorb impact from an object, at least one sensor connected to the platform, and at least one customizable mounting plate connected to the platform;
  a microprocessor adapted to interpret input from the person supported in an upright position as well as the at least one sensor;
  an upper tray assembly accessible to the person supported in an upright position, the upper tray assembly comprising an input device comprising a wired or wireless input which controls wheel motion and steering; and
  a pole adjustable in height connecting the lower assembly with the upper tray assembly so that a position of the upper tray assembly is accessible to the person supported in an upright position, wherein the at least one customizable mounting plate comprises a mounting device attachable to a non-motorized stander.

2. A kit according to claim 1, wherein the at least one sensor comprises a navigational sensor, acoustic sensor, safety sensor, bump sensor, position sensor, GPS, vision sensor, or ultrasound sensor.

3. A kit according to claim 1, wherein the at least one drive wheel comprises a pair of drive wheels.

4. A kit according to claim 1, wherein the at least one customizable mounting plate comprises two customizable mounting plates each of which can be secured to the lower assembly platform at an adjustable distance apart from each other.

5. A kit according to claim 1, wherein the at least one customizable mounting plate comprises a protruding bolt that can be secured to a non-motorized stander.

6. A method for converting a non-motorized stander to a motorized stander comprising:
- removing a wheel assembly from a non-motorized stander; and
- attaching the non-motorized stander having the wheel assembly removed to at least one customizable mounting plate of a kit comprising:
- a lower assembly comprising at least one drive wheel connected to a platform, a motor connected to the at least one drive wheel, a power plant connected to the motor, a bumper connected to the platform and extending beyond the at least one drive wheel towards a front of the lower assembly so as to absorb impact from an object, at least one sensor connected to the platform, and at least one customizable mounting plate connected to the platform,
- a microprocessor,
- an upper tray assembly comprising an input device comprising a wireless input which controls wheel motion and steering, and
- a pole adjustable in height connecting the lower assembly with the upper tray assembly, by attaching a mounting device of the at least one customizable mounting plate to the non-motorized stander.

\* \* \* \* \*

UNITED STATES PATENT AND TRADEMARK OFFICE
CERTIFICATE OF CORRECTION

| | |
|---|---|
| PATENT NO. | : 11,186,342 B2 |
| APPLICATION NO. | : 16/173765 |
| DATED | : November 30, 2021 |
| INVENTOR(S) | : Day, Stegner and Patton |

It is certified that error appears in the above-identified patent and that said Letters Patent is hereby corrected as shown below:

On the Title Page

The listing of Inventors under United States Patent (12) should be changed from:
"Day"
To:
--Day et al.--

The Inventors (72) should be changed from:
"Steven Day, Rochester, NY (US)"
To:
--Steven Day, Rochester, NY (US)
Elizabeth Stegner, Eliot, ME (US)
Wilson Patton, Eliot, ME (US)--

The Assignee (73) should be changed from:
"Institute of Technology"
To:
--Rochester Institute of Technology--

Signed and Sealed this
Sixteenth Day of April, 2024

Katherine Kelly Vidal
*Director of the United States Patent and Trademark Office*